(12) United States Patent
Shadle et al.

(10) Patent No.: US 9,619,195 B2
(45) Date of Patent: Apr. 11, 2017

(54) INVISIBLE LIGHT TRANSMISSION VIA A DISPLAY ASSEMBLY

(71) Applicant: Apple Inc., Cupertino, CA (US)

(72) Inventors: Brian Shadle, Cupertino, CA (US); Ehsan Farkhondeh, Sunnyvale, CA (US); Shin John Choi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 279 days.

(21) Appl. No.: 14/070,002

(22) Filed: Nov. 1, 2013

(65) Prior Publication Data
US 2015/0123887 A1 May 7, 2015

(51) Int. Cl.
*G06F 3/14* (2006.01)
*G09G 3/34* (2006.01)

(52) U.S. Cl.
CPC ............ *G06F 3/14* (2013.01); *G09G 3/3406* (2013.01); *G09G 2370/16* (2013.01); *G09G 2370/18* (2013.01)

(58) Field of Classification Search
None
See application file for complete search history.

(56) References Cited

U.S. PATENT DOCUMENTS

| | | | |
|---|---|---|---|
| 8,287,169 B2 | 10/2012 | Yang et al. | |
| 2003/0095401 A1 | 5/2003 | Hanson et al. | |
| 2006/0221063 A1* | 10/2006 | Ishihara | G06F 3/03545 345/173 |
| 2010/0103268 A1* | 4/2010 | Tokuyama | H04N 5/33 348/162 |
| 2010/0164906 A1 | 7/2010 | Fukunaga et al. | |
| 2013/0112880 A1 | 5/2013 | Katoh et al. | |
| 2013/0265616 A1* | 10/2013 | Okada | G06F 3/0412 358/406 |
| 2014/0002898 A1* | 1/2014 | Kim | G02B 27/22 359/464 |

FOREIGN PATENT DOCUMENTS

WO 2013/044200 3/2013

\* cited by examiner

*Primary Examiner* — Kenneth B Lee, Jr.
(74) *Attorney, Agent, or Firm* — Kendall W. Abbasi

(57) ABSTRACT

Systems, methods, and computer-readable media for transmitting data using invisible light via a display assembly of an electronic device are provided. This may enable more data to be transmitted simultaneously via a single display assembly of a limited size. For example, a single display assembly may simultaneously transmit a first type of data using visible light that may be comprehensible to a user (e.g., textual information that may be legible to a human) as well as a second type of data using invisible light that may be machine-readable (e.g., a barcode that may be detected by a scanner device but that may not be seen by a human).

24 Claims, 10 Drawing Sheets

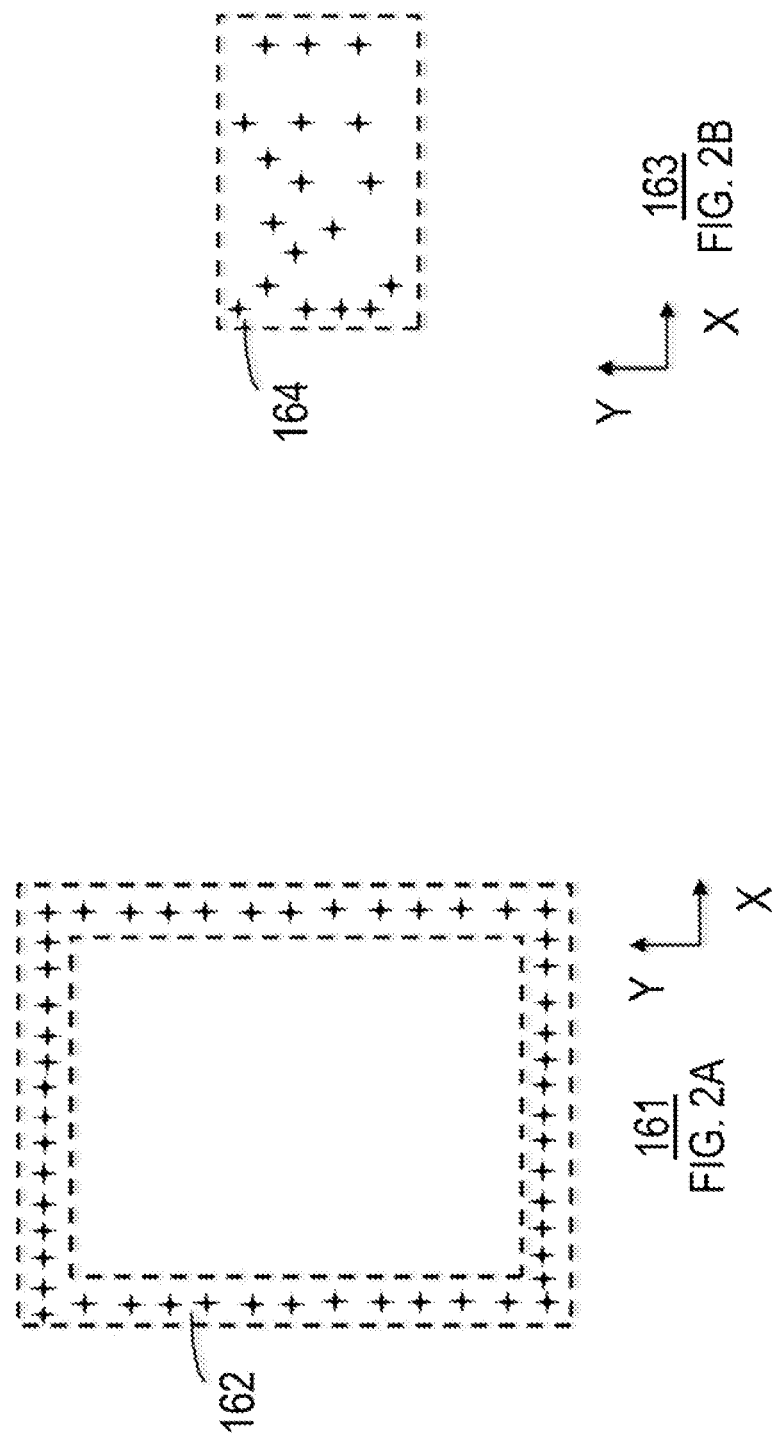

TRANSMITTING VISIBLE LIGHT DATA VIA A DISPLAY ASSEMBLY OF AN ELECTRONIC DEVICE
502

TRANSMITTING INVISIBLE LIGHT DATA VIA THE DISPLAY ASSEMBLY, WHERE THE TRANSMITTED INVISIBLE LIGHT DATA INCLUDES INFORMATION CONFIGURED TO BE RECEIVED AND COMPREHENDED BY A SCANNER DEVICE REMOTE FROM THE ELECTRONIC DEVICE OF AN ELECTRONIC DEVICE
504

500
FIG. 5

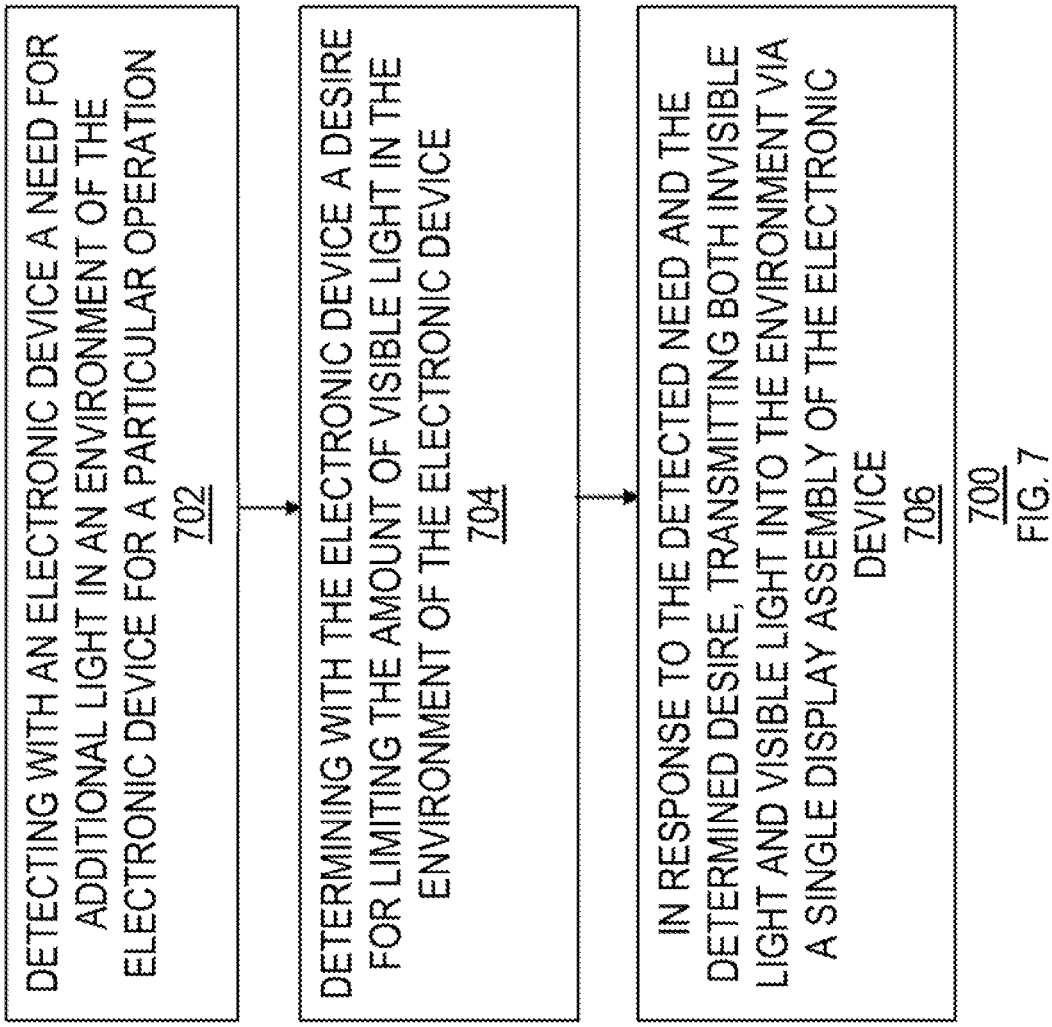

INVISIBLE LIGHT TRANSMISSION VIA A DISPLAY ASSEMBLY

TECHNICAL FIELD

This disclosure relates to the transmission of invisible light and, more particularly, to the transmission of data using invisible light via a display assembly of an electronic device.

BACKGROUND OF THE DISCLOSURE

An electronic device (e.g., a laptop computer, a cellular telephone, etc.) may be provided with one or more display assemblies for providing a first type of visual data that is comprehensible to a user (e.g., textual information that may be legible to a human) as well as a second type of visual data that is machine-readable (e.g., a barcode that may be read by a scanner device and that may be seen but not interpreted by a human). Often times, however, such display assemblies are too small to provide both types of visual data simultaneously.

SUMMARY OF THE DISCLOSURE

This document describes systems, methods, and computer-readable media for transmitting data using invisible light via a display assembly of an electronic device.

For example, an electronic device may include a processor and a display assembly that includes pixels arranged in a pixel matrix and a variable control component spanning the pixel matrix. The processor is configured to control the variable control component for simultaneously varying a first characteristic of visible light transmitted by a first pixel of the pixels and a second characteristic of invisible light transmitted by a second pixel of the pixels.

As another example, an electronic device may include a processor and a display assembly that may include pixels arranged in a pixel matrix and a variable control component spanning the pixel matrix. The processor may be configured to control the variable control component for simultaneously enabling a first characteristic of a first invisible light to be transmitted by a first pixel of the pixels and a second characteristic of a second invisible light to be transmitted by a second pixel of the pixels that is different than the first pixel.

As yet another example, a method may include transmitting visible light data via a display assembly of an electronic device and transmitting invisible light data via the display assembly, where the transmitted invisible light data includes information configured to be received and comprehended by a scanner device remote from the electronic device.

As yet another example, a non-transitory computer-readable medium for controlling an electronic device, including computer-readable instructions recorded thereon may be provided for transmitting visible light data via a display assembly of an electronic device and transmitting invisible light data via the display assembly, where the transmitted invisible light data includes information configured to be received and comprehended by a scanner device remote from the electronic device.

As yet another example, a method may include determining with an electronic device a type of scanner for reading data to be provided by the electronic device, choosing with the electronic device a particular protocol of multiple available protocols based on the determined type of scanner, and transmitting invisible light data via a display assembly of the electronic device according to the chosen protocol.

As yet another example, a method may include detecting with an electronic device a need for additional light in an environment of the electronic device for a particular operation, determining with the electronic device a desire for limiting the amount of visible light in the environment of the electronic device, and, in response to the detected need and the determined desire, transmitting both invisible light and visible light into the environment via a single display assembly of the electronic device.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIGS. 2A and 2B are front views of portions of the display assembly of the electronic device of FIGS. 1 and 2, showing invisible light data that may be transmitted by the display assembly;

FIGS. 5-7 are flowcharts of illustrative processes for transmitting invisible light.

DETAILED DESCRIPTION OF THE DISCLOSURE

Systems, methods, and computer-readable media may be provided to transmit data using invisible light via a display assembly of an electronic device. This may enable more data to be transmitted simultaneously via a single display assembly of a limited size. For example, a single display assembly may simultaneously transmit a first type of data using visible light that may be comprehensible to a user (e.g., textual information that may be legible to a human) as well as a second type of data using invisible light that may be machine-readable (e.g., a barcode that may be detected by a scanner device but that may not be seen by a human). In some embodiments, a single pixel of the display assembly may simultaneously transmit such a first type of data using visible light as well as such a second type of data using invisible light. Alternatively, a single pixel of the display assembly may quickly alternate (e.g., at a refresh rate of the display assembly) between transmitting such a first type of data using visible light and transmitting such a second type of data using invisible light, such that both types of data may be received substantially simultaneously. A display assembly may use various types of display technology to transmit data using invisible light, such as liquid crystal display ("LCD") technology, plasma display technology, organic light-emitting diode ("OLED") display technology, or any other suitable display technology. Moreover, a display assembly may transmit invisible light data according to a selected one of various suitable communications protocols that may be adequately received and utilized by a remote device (e.g., an invisible light scanner or sensor device). For example, the electronic device may select and use a certain communications protocol for transmitting invisible light data based on a particular type of scanner detected near the electronic device and/or based on the particular type of data to be transmitted by the invisible light. Additionally or alternatively, the invisible light transmitted by a display assembly of an electronic device may be received as data by that same electronic device. For example, invisible light transmitted via a display assembly of an electronic device may be reflected off of a user viewing visible light transmitted by that same display assembly and the reflected invisible light may be received by the electronic device for one or more purposes (e.g., for facial recognition of the user).

Figure 1:
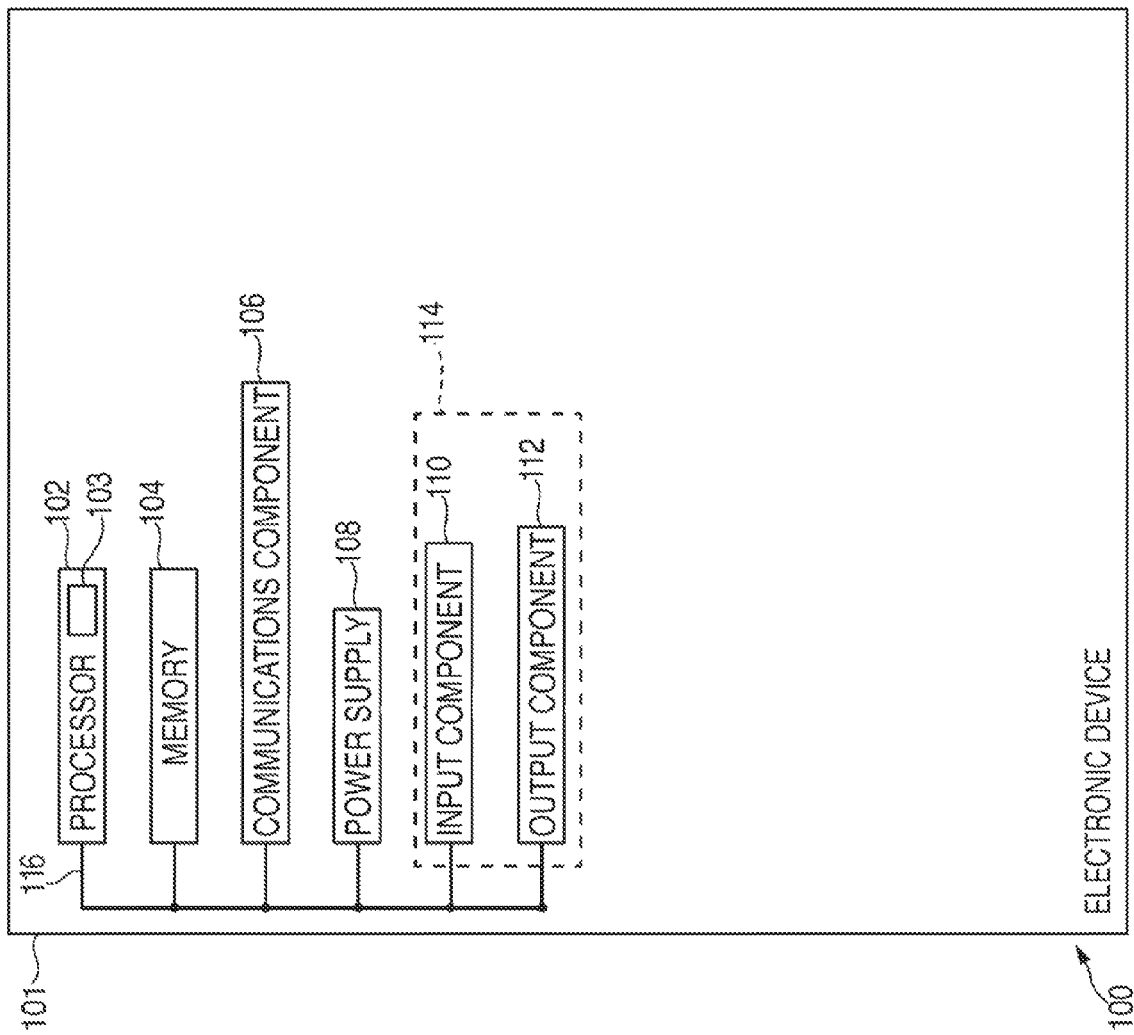
FIG. 1 is a schematic view of an illustrative electronic device for transmitting data using invisible light.

FIG. 1 is a schematic view of an illustrative electronic device 100 for transmitting data using invisible light via a display assembly in accordance with some embodiments. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to displaying light data) and, in other embodiments, electronic device 100 may perform multiple functions (e.g., a device that displays light data, plays music, and receives and transmits telephone calls).

Electronic device 100 may be any portable, mobile, hand-held, or miniature electronic device that may be configured to display light data wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include a processor 102, memory 104, communications component 106, power supply 108, input component 110, and output component 112. Electronic device 100 may also include a bus 116 that may provide one or more wired or wireless communication links or paths for transferring data and/or power to, from, or between various other components of device 100. In some embodiments, one or more components of electronic device 100 may be combined or omitted. Moreover, electronic device 100 may include any other suitable components not combined or included in FIG. 1 and/or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), any other suitable data, or any combination thereof.

Communications component 106 may be provided to allow device 100 to communicate with one or more other electronic devices or servers using any suitable communications protocol. For example, communications component 106 may support Wi-Fi™ (e.g., an 802.11 protocol), ZigBee™ (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., a transceiver or antenna via bus 116) that can enable device 100 to be communicatively coupled to another device (e.g., a host computer, scanner, accessory device, etc.) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi™ technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e. LY when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user or device environment to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, biometric sensor (e.g., a fingerprint reader or other feature recognition sensor, which may operate in conjunction with a feature-processing application that may be accessible to electronic device 100 for authenticating a user), line-in connector for data and/or power, and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, line-out connectors for data and/or power, visual displays (e.g., for transmitting data via visible light and/or via invisible light), infrared ports, flashes (e.g., light sources for providing artificial light for illuminating an environment of the device), tactile/haptic outputs (e.g., rumblers, vibrators, etc.), and combinations thereof.

As a specific example, electronic device 100 may include a display assembly output component as output component 112. Such a display assembly output component may include any suitable type of display or interface for presenting visual data to a user with visible light and data to an electronic device with invisible light. A display assembly output component may include a display embedded in device 100 or coupled to device 100 (e.g., a removable display). A display assembly output component may include, for example, a liquid crystal display ("LCD"), a light emitting diode ("LED") display, a plasma display, an organic light-emitting diode ("OLED") display, a surface-conduction electron-emitter display ("SED"), a carbon nanotube display, a nanocrystal display, any other suitable type of display, or combination thereof. Alternatively, a display assembly output component can include a movable display or a projecting system for providing a display of content on a surface remote from electronic device 100, such as, for example, a video projector, a head-up display, or a three-dimensional (e.g., holographic) display. As another example, a display assembly output component may include a digital or mechanical viewfinder, such as a viewfinder of the type found in compact digital cameras, reflex cameras, or any other suitable still or video camera. A display assembly output component may include display driver circuitry, circuitry for driving display drivers, or both, and such a display assembly output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 1, processor 102 may be used to run one or more applications, such as an application 103. Application 103 may include, but is not limited to, one or more operating system applications, firmware applications, media playback applications, media editing applications, pass applications, calendar applications, state determination applications, biometric feature-processing applications, or any other suitable applications. For example, processor 102 may load application 103 as a user interface program to determine how instructions or data received via an input component 110 or other component of device 100 may manipulate the one or more ways in which information may be stored and/or provided to the user via an output component 112. Application 103 may be accessed by processor 102 from any suitable source, such as from memory 104 (e.g., via bus 116) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
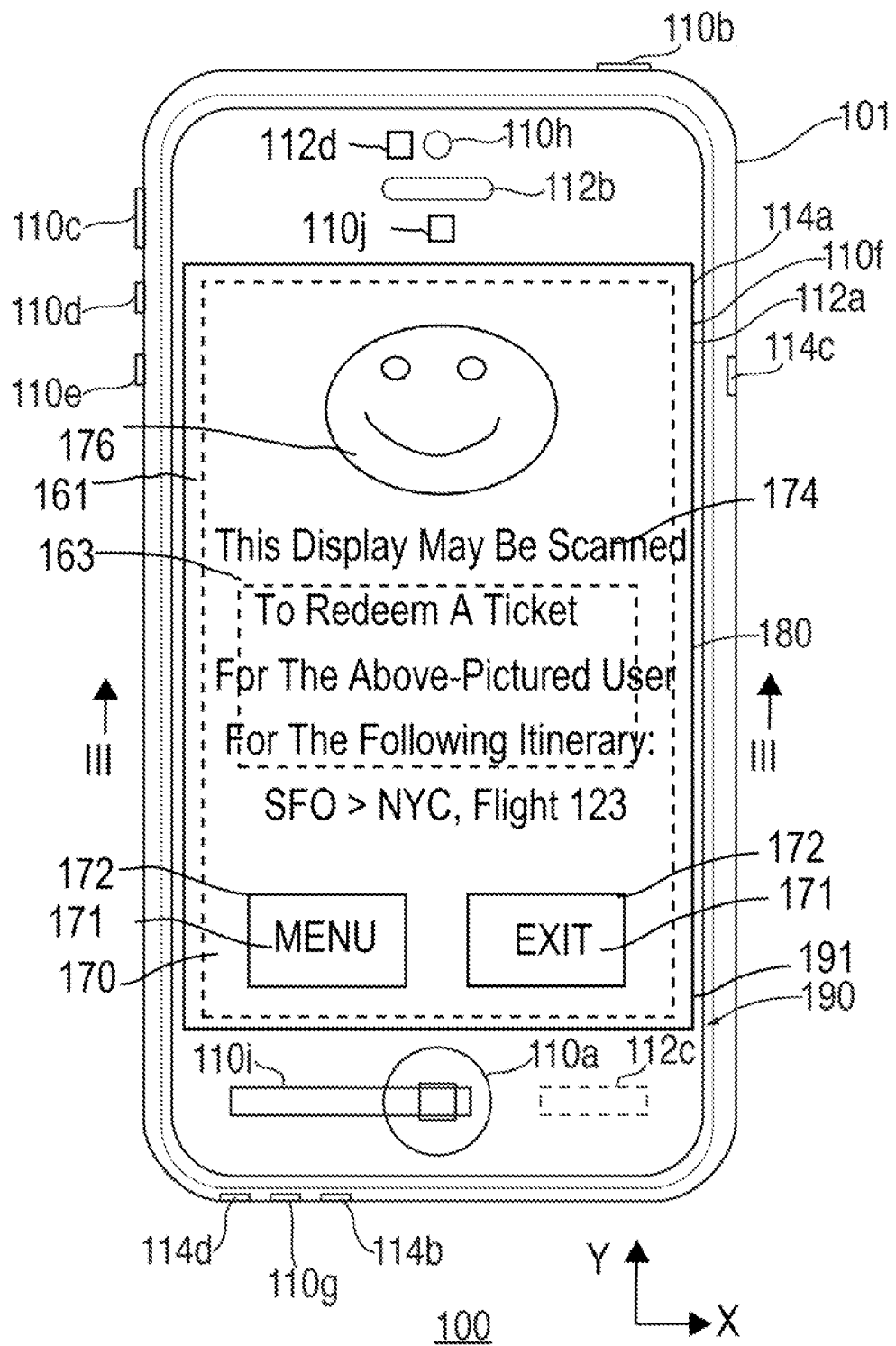
FIG. 2 is a front view of the electronic device of FIG. 1, showing visible light data that may be transmitted by a display assembly of the electronic device.

As shown in FIG. 2, one specific example of electronic device 100 may be a handheld electronic device, such as an iPhone™, where housing 101 may allow access to various input components 110a-110j, various output components 112a-112d, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100 (e.g., for increasing or decreasing the intensity or brightness of visible light data transmitted by a display output component). Each one of input components 110a-110e may be a mechanical input component, such as a button supported by a dome switch, a sliding switch, a control pad, a key, a knob, a scroll wheel, or any other suitable form.

Electronic device 100 may include various I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker. Additionally or alternatively, electronic device 100 may also include at least one tactile output component 112c (e.g., a rumbler, vibrator, etc.), a camera and/or scanner input component 110h (e.g., a video or still camera, and/or a barcode scanner or any other suitable scanner that may obtain product identifying information from a code, such as a barcode), a biometric input component 110i (e.g., a fingerprint reader or other feature recognition sensor, which may operate in conjunction with a feature-processing application that may be accessible to electronic device 100 for authenticating a user), and a light sensor input component 110j (e.g., an ambient light sensor). As shown in FIG. 2, at least a portion of biometric input component 110i may be incorporated into or otherwise combined with input component 110a or any other suitable I/O component of device 100. For example, biometric input component 110i may be a fingerprint reader that may be configured to scan the fingerprint of a user's finger as the user interacts with mechanical input component 110a by pressing input component 110a with that finger. Moreover, electronic device 100 may include a flash output component 112d, which may include one or more light sources for providing artificial light for illuminating an environment of device (e.g., such that camera input component 110h may accurately capture an image of the environment).

Figure 3:
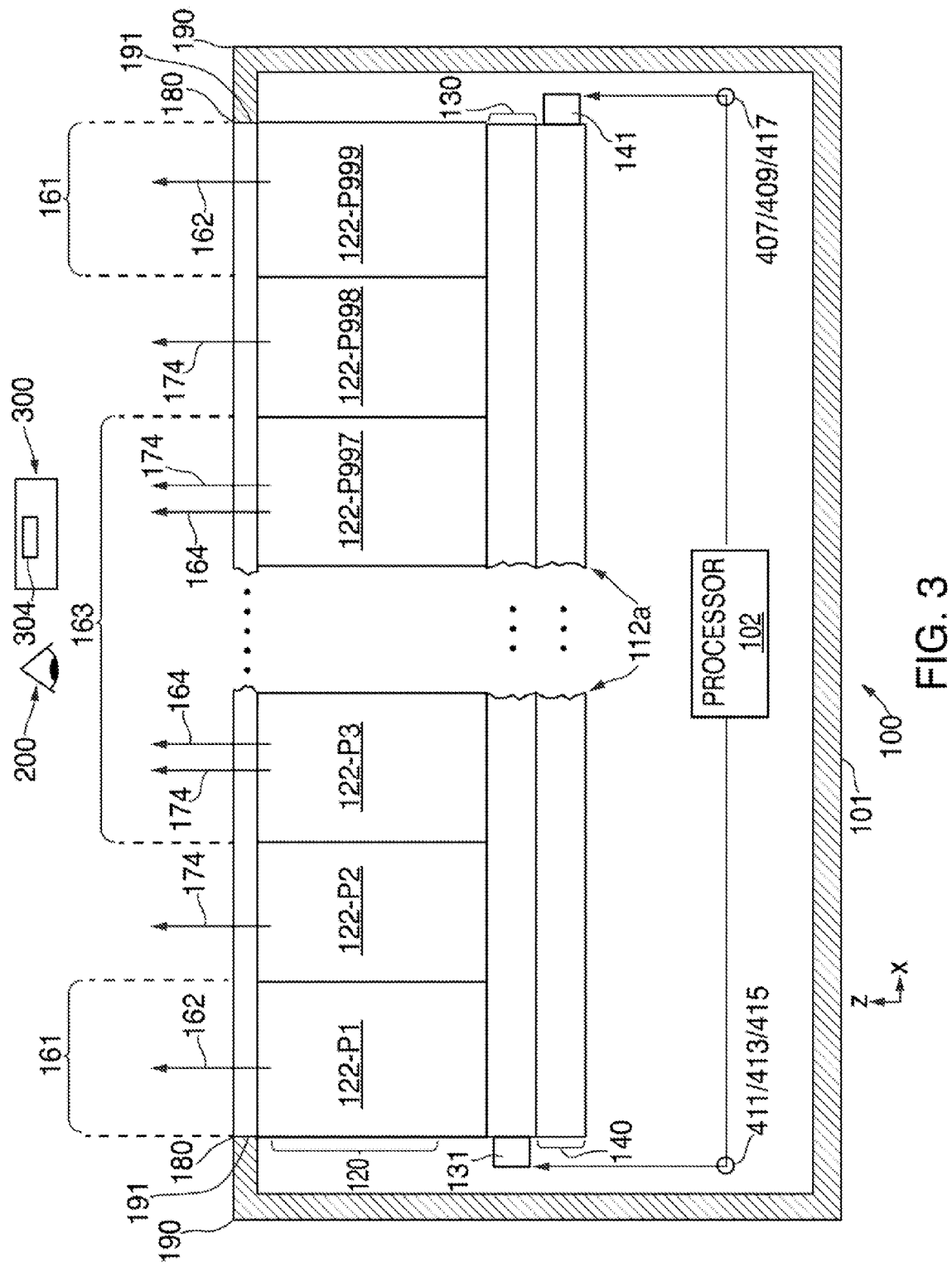
FIG. 3 is a cross-sectional view of a portion of the electronic device of FIGS. 1-2B, taken from line III-III of FIG. 2, showing both visible light data and invisible light data that may be transmitted by the display assembly of the electronic device.
Figure 4:
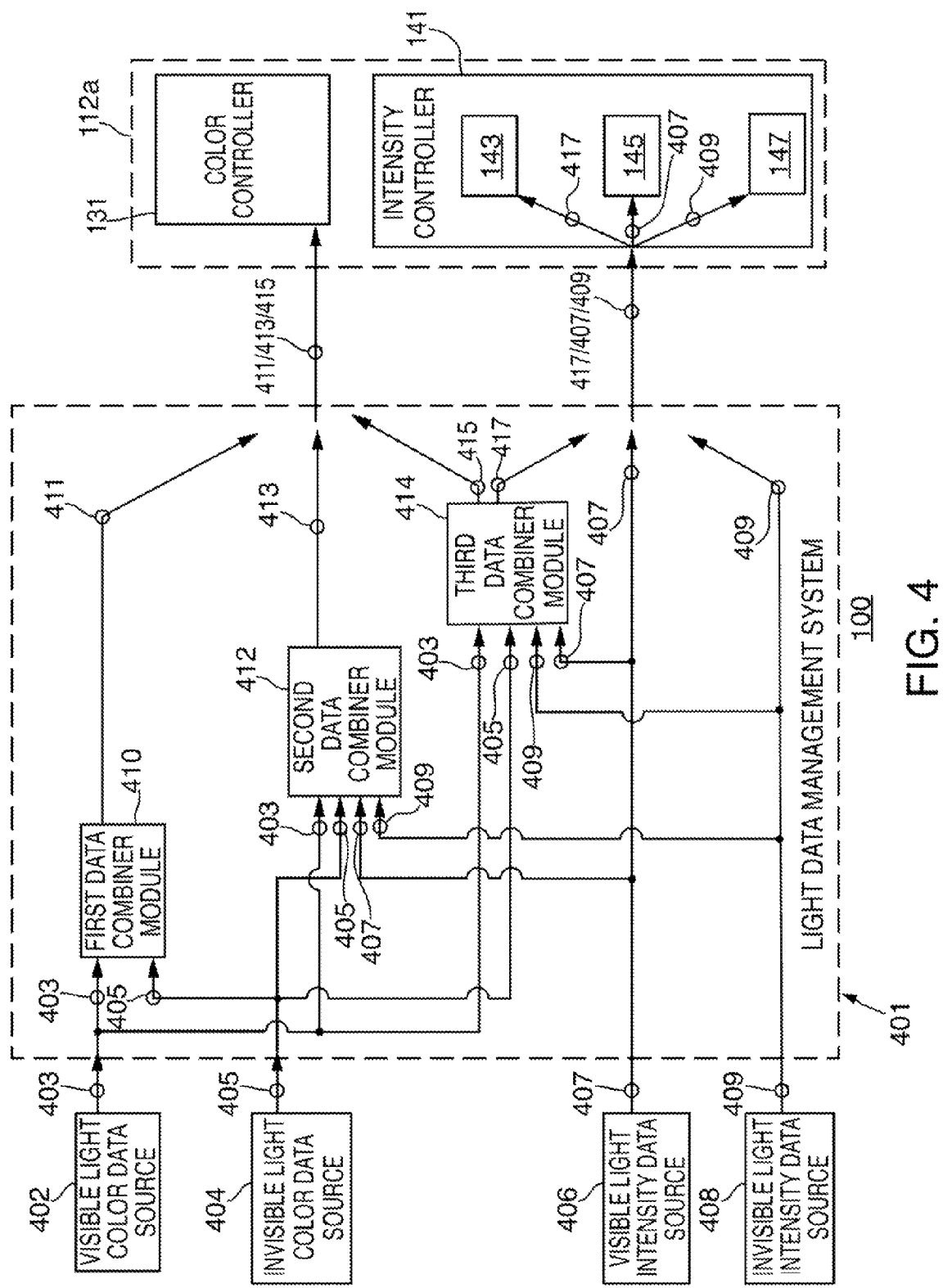
FIG. 4 is a schematic view of an illustrative portion of the electronic device of FIGS. 1-3.

As shown in FIGS. 2-4, an output component 112a of electronic device 100 may be a display assembly that can be used to transmit light data onto and through a display surface 180 that may be exposed through an opening in housing 101 (e.g., through an opening 191 that may be provided through a front surface wall 190 of housing 101). In some embodiments, display assembly output component 112a may be configured to transmit visible light data to a user, for example, as part of a visual or graphic user interface ("GUI") 170, which may allow a user to comprehend visual information provided by electronic device 100. Such a GUI 170 may include various layers, windows, screens, templates, elements, menus, and/or other informational components of a currently running application (e.g., application 103) that may be transmitted as visible light data onto and through all or some of the areas of display surface 180 of display assembly output component 112a. One or more of user input components 110a-110j may be used to navigate through GUI 170. For example, one user input component 110 may include a scroll wheel that may allow a user to select one or more graphical elements or icons 172 of GUI 170. Icons 172 may also be selected via a touch screen I/O component 114a that may include display assembly output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 172 may represent various layers, windows, screens, templates, elements, and/or other components that may be displayed in some or all of the areas of display surface 180 of display assembly output component 112a upon selection by the user. Furthermore, selection of a specific icon 172 may lead to a hierarchical navigation process. For example, selection of a specific icon 172 may lead from the displayed screen of visible light data of FIG. 2 to a new screen of GUI 170 that may include one or more additional icons or other GUI elements of the same application or of a new application associated with that icon 172.

Textual indicators 171 may be displayed on or near each icon 172 to facilitate user interpretation of each graphical element icon 172. Additionally or alternatively to indicators 171 and icons 172, GUI 170 may include various other types of visible light data, such as textual information 174 (e.g., textual information that may be read by a user but that may not be specifically associated with a specific icon 172), photographic or video information 176 (e.g., icons, pictures, moving picture data, etc.) that may be comprehended but potentially not "read" by a user, and any other suitable type of visual information that may be visibly detected by a user (e.g., a barcode that may be read by a scanner device and that may also be seen but not interpreted by a human). For example, as shown in FIG. 2, GUI 170 may include textual information 174 as visible light data indicating that a ticket may be redeemed by scanning the display (e.g., by scanning display surface 180 of display assembly output component 112a) as well as photographic information 176 as visible light data showing a picture of a traveler that may be allowed to use such a ticket, where such a GUI 170 may be under the control of an airline ticketing application 103.

Moreover, display assembly output component 112a may be configured to transmit invisible light data onto and through display surface 180. In some embodiments, display assembly output component 112a may be configured to transmit invisible light data via one or more regions of display surface 180 simultaneously with or in a rapidly alternating fashion with the visible light data of visual GUI 170 (e.g., icons 172, textual information 174, and photographic information 176), which may allow an electronic device (e.g., scanner device 300 of FIG. 3) to receive invisible data from device 100 via display assembly output component 112a at generally the same time as a user (e.g., user 200 of FIG. 3) may receive visible data from device 100 via display assembly output component 112a. For example, as shown, a first region 161 of display surface 180 may be a band region adjacent the outer perimeter of display surface 180 and display assembly output component 112a may be configured to transmit a first type of invisible light data (e.g., invisible light data 162 of FIGS. 2A and 3) onto and through first region 161 of display surface 180. Additionally or alternatively, as shown, a second region 163 of display surface 180 may be a rectangular region near the middle of display surface 180 and display assembly output component 112a may be configured to transmit a second type of invisible light data (e.g., invisible light data 164 of FIGS. 2B and 3) onto and through second region 163 of display surface 180.

In some embodiments, invisible light data 162 may be transmitted by display assembly output component 112a through first region 161 to provide the data necessary to redeem the ticket described by textual information visible light data 174 of FIG. 2. Therefore, in some embodiments, invisible light data 162 may be generated and transmitted under the control of the same application as GUI 170 (e.g., an airline ticketing application 103) and/or under the control of a different but concurrently run application as the application controlling GUI 170. For example, invisible light data 162 may be provided through the entirety of first region 161 (e.g., through each pixel of first region 161) in a synchronized on and off pulsing that may be interpreted as data by scanner 300. For example, invisible light data 162 may be provided through first region 161 to scanner 300 in a Morse-code type of communication protocol (e.g., where a number of pulses per set time period may define the communicated data) and/or in a serial peripheral interface ("SPI") type communication protocol (e.g., where the specific timing of high to low or low to high pulses may define the communicated data). Additionally or alternatively, in some embodiments, invisible light data 164 may be transmitted by display assembly output component 112a through second region 163 to provide the data necessary to redeem the ticket described by textual information visible light data 174 of FIG. 2. Therefore, in some embodiments, invisible light data 164 may be generated and transmitted under the control of the same application as GUI 170 (e.g., an airline ticketing application 103) and/or under the control of a different but concurrently run application as the application controlling GUI 170. For example, invisible light data 164 may be provided in a specific pattern through portions of second region 163 (e.g., various particular pixels of first region 161 may transmit invisible light data 164 to form a barcode representation) that may be interpreted as data by scanner 300. For example, invisible light data 164 may be provided through second region 163 to scanner 300 as a linear barcode (e.g., as a U.P.C. barcode) and/or as a matrix or two-dimensional barcode (e.g., as a data matrix barcode or a QR code) that may define the data to be communicated when scanned by scanner 300. In other embodiments, invisible light data 162 and/or invisible light data 164 may be generated and transmitted under the control of any application that may be totally distinct from the application controlling GUI 170, such that invisible light data 162 and/or invisible light data 164 may be totally distinct from any visible light data provided by GUI 170.

Various different communication protocols may be used to encode data in the generated and transmitted invisible light (e.g., invisible light data 162 and/or invisible light data 164) that may be received and utilized by scanner 300 from display assembly output component 112a. The various communication protocols may vary with respect to which region of display surface 180 may be used to transmit the invisible light data (e.g., first region 161, second region 163, the entirety of surface 180, etc.) and with respect to which manner the invisible light data is transmitted through such a display region (e.g., in a synchronized on and off pulsing manner, such as Morse-code, or as a static barcode). For example, in some embodiments, electronic device 100 (e.g., an application 103 accessible to processor 102) may be configured to determine the proper communication protocol to be used based on any suitable information, such as the type of visible light data currently being transmitted by display assembly output component 112a, the type of data to be transmitted via the invisible light (e.g., airline ticket information), the type of scanner that may be used to receive and utilize the invisible light data (e.g., the type of scanner 300), and the like. In some embodiments, scanner 300 may include a scanner communications component 302 that may communicate scanner information indicative of one or more characteristics of scanner 300 to device 100 (e.g., via communications component 106), and device 100 may utilize that scanner information to determine the communications protocol to use for transmitting invisible light data to scanner 300. Such scanner information may indicate what communication protocols it is configured to use for receiving and detecting invisible light data. For example, some scanners may distinguish individual pixels of invisible light data from display assembly output component 112a, such that the invisible light data may be transmitted as barcode data to such scanners. In some specific examples, some scanners may distinguish individual pixels of invisible light data only with respect to whether they are on or off, while other scanners may distinguish individual pixels of invisible light data as well as various intensity levels of invisible light data transmitted from each pixel, such that even more data may be transmitted via invisible light data. However, some scanners may only be configured to distinguish whether any invisible light data is received or not (e.g., above a particular threshold) and not at an individual pixel level, such that the invisible light data may be transmitted via one, some, or all pixels in a synchronized on and off pulsing manner, such as via a Morse-code communication protocol, to such scanners. Additionally or alternatively, such scanner information provided to device 100 may be indicative of a distance between scanner 300 and device 100, where such distance may determine what communication protocol to use for transmitting invisible light data to scanner 300.

Display assembly output component 112a may be any suitable display assembly using any suitable display technology or combination of display technologies such that display assembly output component 112a may be configured to transmit both visible light data and invisible light data, either simultaneously or in a rapidly alternating fashion, such that each type of light data may be detected concurrently by different entities (e.g., such that the visible light data may be detected by a human user while the invisible light data may be detected by a scanner device). For example, as shown in FIG. 3, display assembly output component 112a may include a matrix 120 of pixels 122, where each pixel may be electrically controlled to vary the color and/or intensity of light transmitted by that pixel. Pixel matrix 120 may include any suitable number of rows and columns of pixels 122 spanning underneath display surface 180 (e.g., nine hundred and ninety nine pixels 122-P1 through 122-P999 may span a single row of pixel matrix 120 along the X-axis of display surface 180, as shown in FIG. 3, while any suitable number of pixels 122 (e.g., three thousand pixels) may span each column of pixel matrix 120 along the Y-axis of display surface 180). Each pixel 122 of pixel matrix 120 may be configured to transmit visible light data, invisible light data, or both visible light data and invisible light data. Display assembly output component 112a may also include an associated matrix 130 of electrodes or electronic switches, each of which may address a respective pixel 122 of pixel matrix 120 for individually electrically controlling the color and/or intensity of light transmitted by that pixel 122. Electronic switch matrix 130 may span the entirety of pixel matrix 120 for electrically controlling every pixel 122 of pixel matrix 120. A color controller 131 of display assembly output component 112a may be configured to control electronic switch matrix 130 via one or more instructions or control signals that may be provided by processor 102 (e.g., control signals 411, 413, and/or 415), which may thereby control at least the color of light transmitted by each pixel 122 of pixel matrix 120.

Figure 3A:
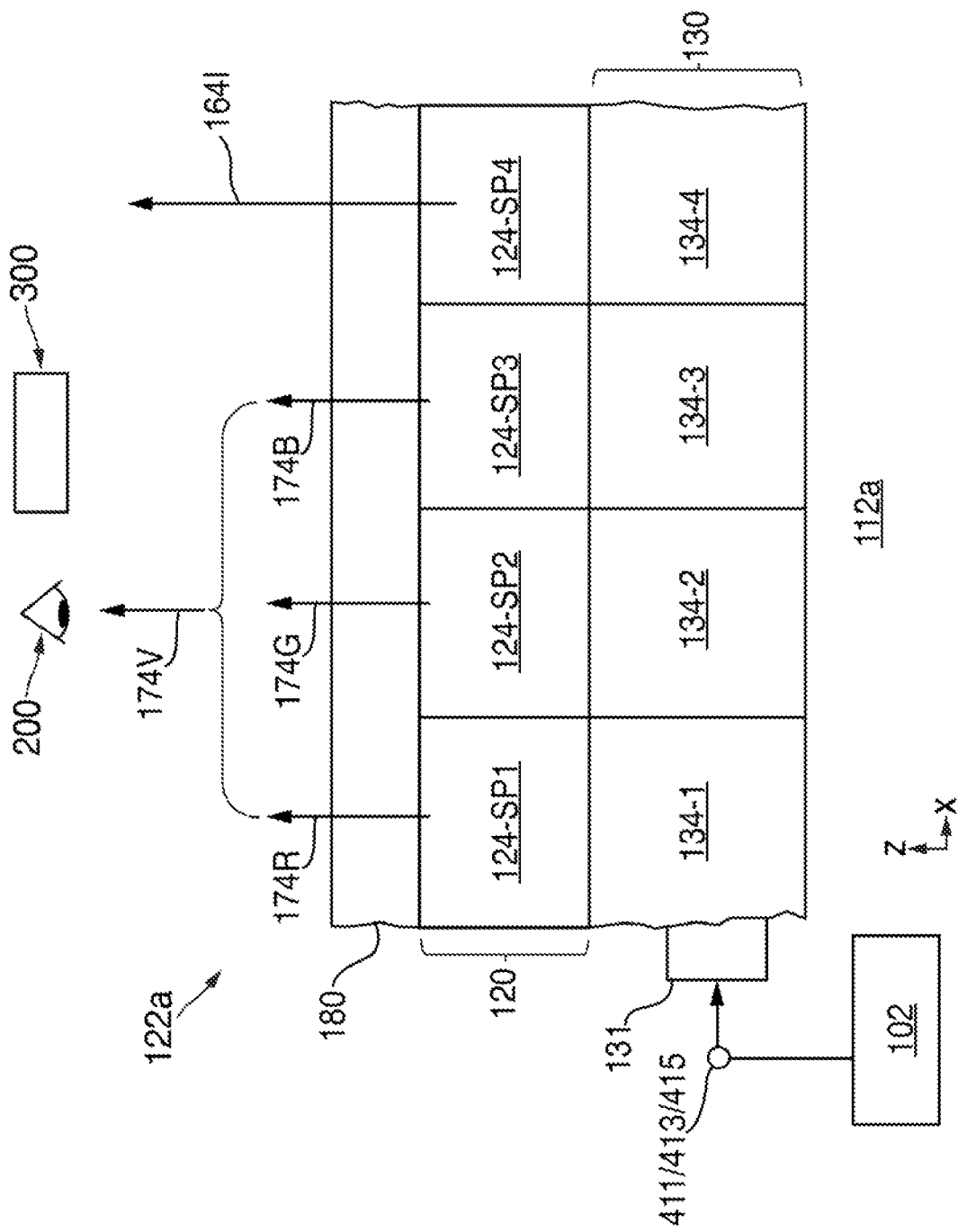
FIGS. 3A and 3B are cross-sectional views, similar to FIG. 3, of various embodiments of a portion of the display assembly of the electronic device of FIGS. 1-3.

In some embodiments, each pixel 122 of pixel matrix 120 may be configured to create its own luminance in response to being electrically controlled by switch matrix 130 to form visible light data and/or invisible light data (e.g., when display assembly output component 112a may include plasma or OLED display technology). For example, as shown in FIG. 3A, a particular portion of pixel matrix 120 may include a pixel 122a, which may be any suitable pixel, including any one of pixels 122-P1 through 122-P999, and may be configured to create its own luminance. As shown, pixel 122a may include a subpixel arrangement including any number of subpixels 124 (e.g., subpixels 124-SP1, 124-SP2, 124-SP3, and 124-SP4). For example, when pixel 122a is provided by plasma display technology, each one of subpixels 124 may be a small chamber that may contain gas (e.g., a mixture of inert xenon and neon gasses) and whose sides may be coated with appropriately colored phosphorous, such that a respective switch 134 (e.g., a respective one of switches 134-1 through 134-4 of FIG. 3A) of switch matrix 130 for a respective subpixel 124 may be electrically addressed and controlled to heat its respective subpixel 124, thereby turning the gas inside the subpixel into plasma, which may emit radiation and may excite the phosphorous coating of the heated subpixel 124 such that it may transmit light of the color of the phosphorous coating. The chamber of each subpixel 124 of pixel 122a may be coated with a different color phosphorous. For example, subpixel 124-SP1 may be coated with a visible red color phosphorous, subpixel 124-SP2 may be coated with a visible green color phosphorous, and subpixel 124-SP3 may be coated with a visible blue color phosphorous, such that differing intensities of visible light for each of these visible colors may be produced by pulsing each subpixel 124-SP1 through 124-SP3 on and off during each frame of data via color controller 131, and the overall color and brightness of the visible light produced by pixel 122a may be the combined relative intensities of each of its subpixels' visible colors (e.g., red visible light 174R transmitted by subpixel 124-SP1, green visible light 174G transmitted by subpixel 124-SP2, and blue visible light 174B transmitted by subpixel 124-SP3 may be combined and viewed by user 200 as visible light data 174V, which may be a portion of textual information visible light data 174 of FIGS. 2 and 3). Moreover, subpixel 124-SP4 may be coated with an invisible color phosphorous (e.g., infrared or ultraviolet), such that differing intensities of invisible light for such an invisible color may be produced by pulsing subpixel 124-SP4 on or off during each frame of data via color controller 131, and the overall color and brightness of the invisible light produced by pixel 122a may be that of subpixel 124-SP4 (e.g., invisible light 164I transmitted by subpixel 124-SP4 may be viewed by scanner device 300 as invisible light data 164I, which may be a portion of invisible light data 164 of FIGS. 2B and 3). In some embodiments, color controller 131 may be configured to control pixel 122a to generate and transmit both visible light data 174V and invisible light data 164I simultaneously (e.g., in a single refresh of data). Alternatively, color controller 131 may be configured to control pixel 122a to rapidly switch between generating and transmitting visible light data 174V and generating and transmitting invisible light data 164I (e.g., alternating whether visible light data or invisible light data is transmitted from one refresh to the next).

Figure 3B:
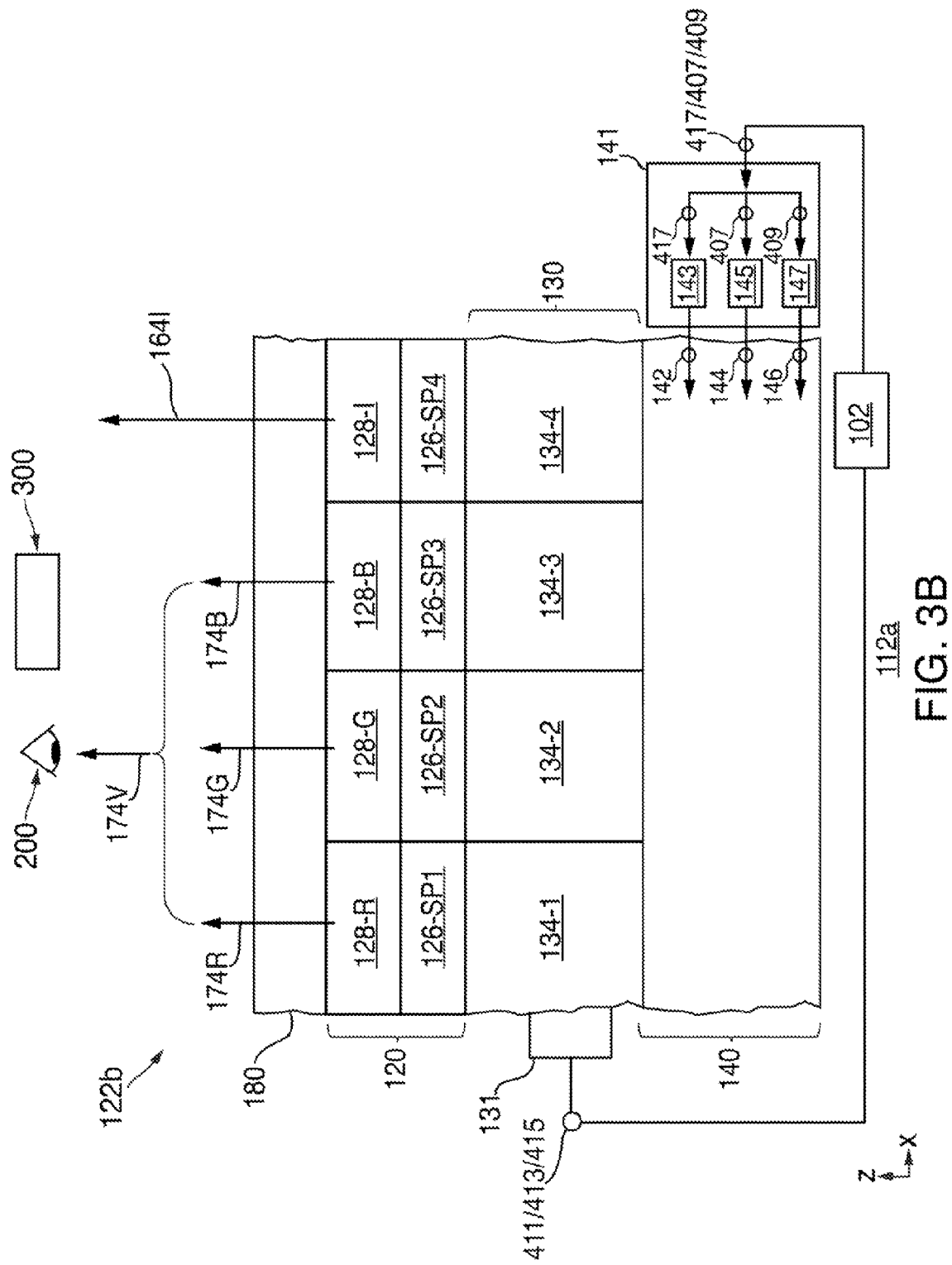

Alternatively, in some embodiments, each pixel of pixel matrix 120 may not be configured to create its own luminance in response to being electrically controlled by switch matrix 130, but instead each pixel may controllably vary the amount of light it may pass from a light source, such as a backlight 140 (e.g., when display assembly output component 112a may include LCD display technology). For example, as shown in FIG. 3, display assembly output component 112a may include backlight 140 that may span at least a portion of pixel matrix 120 for providing light that may be variably passed through each pixel of pixel matrix 120 by switch matrix 130 to form visible light data and/or invisible light data. In such embodiments, an intensity controller 141 of display assembly output component 112a may be configured to control backlight 140 via one or more instructions or control signals provided by processor 102 (e.g., control signals 407, 409, and/or 417), which may thereby control at least the intensity of light able to be transmitted by each pixel of pixel matrix 120. As shown in FIG. 3B, a particular portion of pixel matrix 120 may include a pixel 122b, which may be any suitable pixel, including any one of pixels 122-P1 through 122-P999, and may be configured to rely on backlight 140 for luminance. As shown, pixel 122b may include a subpixel arrangement including any number of subpixels 126 (e.g., subpixels 126-SP1, 126-SP2, 126-SP3, and 126-SP4). For example, when pixel 122b is provided by LCD display technology, each one of subpixels 126 may be a thin layer of liquid crystals that may be aligned with a respective color filter 128, such that a respective switch 134 (e.g., a respective one of switches 134-1 through 134-4 of FIG. 3B) of switch matrix 130 for a respective subpixel 126 may be electrically addressed and controlled to vary a voltage applied to its respective subpixel 126, thereby varying the amount of light provided by backlight 140 that may be able to pass through that subpixel 126 and thus its respective color filter 128. Each color filter 128 of pixel 122b may be for a different color. For example, subpixel 126-SP1 may be aligned with a visible red color filter 128-R, subpixel 126-SP2 may be aligned with a visible green color filter 128-G, and subpixel 126-SP3 may be aligned with a visible blue color filter 128-B, such that differing intensities of visible light for each of these visible colors may be produced by pulsing each subpixel 126-SP1 through 126-SP3 on and off during each frame of data via color controller 131, and the overall color of the visible light transmitted by pixel 122b from backlight 140 may be the combined relative intensities of each of its subpixels' transmitted visible colors (e.g., red visible light 174R transmitted by subpixel 126-SP1 via visible red color filter 128-R, green visible light 174G transmitted by subpixel 126-SP2 via visible green color filter 128-G, and blue visible light 174B transmitted by subpixel 126-SP3 via visible blue color filter 128-B may be combined and viewed by user 200 as visible light data 174V, which may be a portion of textual information visible light data 174 of FIGS. 2 and 3). Moreover, subpixel 126-SP4 may be aligned with an invisible color filter 128-I (e.g., an infrared or ultraviolet color filter), such that differing intensities of invisible light for such an invisible color may be produced by pulsing subpixel 126-SP4 on or off during each frame of data via color controller 131, and the overall color of the invisible light produced by pixel 122b may be that of subpixel 124-SP4 (e.g., invisible light 164I transmitted by subpixel 124-SP4 via invisible color filter 128-I may be viewed by scanner device 300 as invisible light data 164I, which may be a portion of invisible light data 164 of FIGS. 2B and 3). In some embodiments, color controller 131 may be configured to control pixel 122b to generate and transmit both visible light data 174V and invisible light data 164I simultaneously (e.g., in a single refresh of data). Alternatively, color controller 131 may be configured to control pixel 122b to rapidly switch between generating and transmitting visible light data 174V and generating and transmitting invisible light data 164I (e.g., alternating whether visible light data or invisible light data is transmitted from one refresh to the next).

While color controller 131 of display assembly output component 112a may be configured to control electronic switch matrix 130 via one or more control signals that may be provided by processor 102 (e.g., control signals 411, 413, and/or 415) for controlling the color of light transmitted by pixel 122b (e.g., the combined color of visible light data 174V by varying the voltages applied to its respective subpixels 126, thereby varying the amount of light from backlight 140 able to pass through each subpixel 126), intensity controller 141 of display assembly output component 112a may be configured to control the intensity of light transmitted by pixel 122b via one or more control signals provided by processor 102 (e.g., control signals 407, 409, and/or 417). For example, as shown in FIG. 3B, backlight 140 may include one or more types of light sources (e.g., LEDs or any other suitable source of light) for transmitting light through backlight 140 (e.g., through a light guide pipe of backlight 140) and eventually through one or more subpixels 126 of pixel 122b and then onto and through display surface 180. In some embodiments, intensity controller 141 of backlight 140 may include one or more all light sources 143, which may be configured to transmit full spectrum light 142 over the full spectrum of both visible light and invisible light through backlight 140. In such embodiments, not only may full spectrum light 142 be passed from all light source 143 through backlight 140, through one or more of subpixels 126-SP1, 126-SP2, and 126-SP3, and through one or more of associated visible color filters 128-R, 128-G, and 128-B as visible light data 174V to user 200, but also full spectrum light 142 may be passed from all light source 143 through backlight 140, through subpixel 126-SP4, and through associated invisible color filter 128-1 as invisible light data 164I to scanner 300. Therefore, the intensity (e.g., brightness) of visible light data 174V and the intensity (e.g., brightness) of invisible light data 164I may both be dependent upon the intensity (e.g., brightness) of full spectrum light 142 passed from all light source 143.

Alternatively or additionally, in some embodiments, intensity controller 141 of backlight 140 may include one or more visible light sources 145, which may be configured to transmit visible spectrum light 144 over the spectrum of visible light through backlight 140, as well as one or more invisible light sources 147, which may be configured to transmit invisible spectrum light 146 over the spectrum of invisible light through backlight 140. In such embodiments, visible spectrum light 144 may be passed from visible light source 145 through backlight 140, through one or more of subpixels 126-SP1, 126-SP2, and 126-SP3, and through one or more of associated visible color filters 128-R, 128-G, and 128-B as visible light data 174V to user 200, while invisible spectrum light 146 may be passed from invisible light source 147 through backlight 140, through subpixel 126-SP4, and through associated invisible color filter 128-1 as invisible light data 164I to scanner 300. Therefore, the intensity (e.g., brightness) of visible light data 174V and the intensity (e.g., brightness) of invisible light data 164I may be independently controlled via the intensity (e.g., brightness) of light passed from respective independent light sources 145 and 147. In some embodiments, the intensity of one of visible light data 174V and invisible light data 164I transmitted by pixel 122b may further be based on additional control of one or more subpixels 126 via color controller 131, as described below in more detail with respect to module 414 of FIG. 4.

Certain pixels 122 of display assembly output component 112a (e.g., pixels 122-P3 through 122-P997) may be configured to transmit both invisible light data (e.g., second invisible light data 164) as well as visible light data (e.g., textual information visible light data 174) onto and through second region 163 of display surface 180, either simultaneously or in rapid alternating fashion (e.g., at the display refresh rate of data transmission of display assembly output component 112a). Each one of such pixels may be configured like any one of pixels 122a and 122b. However, in some embodiments, certain other pixels 122 of display assembly component 112a (e.g., pixels 122-P2 and 122-P998) may be configured to transmit only visible light data (e.g., textual information visible light data 174) onto and through a region of display surface 180 between first region 161 and second region 163. Such pixels may be similar to pixels 122a and 122b, but may not include invisible light subpixel 124-SP4 or invisible light subpixel 126-SP4 and invisible light color filter 128-I. Moreover, in some embodiments, certain other pixels 122 of display assembly component 112a (e.g., pixels 122-P1 and 122-P999) may be configured to transmit only visible light data (e.g., first invisible light data 162) onto and through first region 161 of display surface 180. Such pixels may be similar to pixels 122a and 122b, but may not include visible light subpixels 124-SP1 through 124-SP3 or visible light subpixels 126-SP1 through 126-SP3 and visible light color filters 128-R, 128-G, and 128-B. For example, first region 161 may be a border region of touch screen I/O component 114a that may not be configured to transmit visible light data, as that region may not be configured to receive any user touches so close to an edge of surface 180, and it may be desirable to avoid transmitting any visible light data through such a portion of surface 180 that a user cannot communicatively or interactively touch. Therefore, first region 161 may be utilized by a portion of display assembly output component 112a that may be configured to transmit only invisible light data. In other embodiments, all pixels 122 of display assembly output component 112a (e.g., pixels 122-P1 through 122-P999) may be configured to transmit both invisible light data as well as visible light data, either simultaneously or in rapid alternating fashion (e.g., at the display refresh rate of data transmission of display assembly output component 112a).

FIG. 4 shows a schematic view of a light data management system 401 of electronic device 100 that may be provided to manage the various types of light data (e.g., visible light data and invisible light data) that may be transmitted by device 100 (e.g., via display assembly output component 112a). System 401 may be configured to receive light data from various sources and combine the received data into one or more instructions or control signals for one or both of color controller 131 and intensity controller 141 to properly control the operation of display assembly output component 112a. For example, as shown, system 401 may be configured to receive visible light color data 403 from a visible light color data source 402, where visible light color data 403 may be any suitable data that may be representative of the visible content to be provided to a user (e.g., visible light data 172, 174, and 176 of GUI 170), and where visible light color data source 402 may be any suitable source for providing such data (e.g., an airline ticketing application 103, which may be accessible to processor 102). Moreover, as also shown, system 401 may be configured to receive invisible light color data 405 from an invisible light color data source 404, where invisible light color data 405 may be any suitable data that may be representative of the invisible content to be provided to a scanner (e.g., invisible light data 162 and 164), and where invisible light color data source 404 may be any suitable source for providing such data (e.g., an airline ticketing application 103, which may be accessible to processor 102, or any other source that may be distinct from visible light color source 402). Moreover, as also shown, system 401 may be configured to receive visible light intensity data 407 from a visible light intensity data source 406, where visible light intensity data 407 may be any suitable data that may be representative of the intensity (e.g., brightness) value(s) at which visible content is to be provided to a user (e.g., the intensity at which visible light data 172, 174, and 176 of GUI 170 is to be displayed to user 200), and where visible light intensity data source 406 may be any suitable source for providing such intensity data (e.g., an airline ticketing application 103, which may be accessible to processor 102, or a more root application 103 of device 100 that may dictate all other applications running on device 100, such as an application that dictates the intensity of any information displayed by output component 112a, where such intensity data of such an application may be controlled by a user of device 100 (e.g., by increasing or decreasing the desired intensity of visible light data from output component 112a via a user's interaction with one or more of input components 110d and 110e)). Moreover, as also shown, system 401 may be configured to receive invisible light intensity data 409 from an invisible light intensity data source 408, where invisible light intensity data 409 may be any suitable data that may be representative of the intensity (e.g., brightness) value(s) at which invisible content is to be provided to a user (e.g., the intensity at which invisible light data 162 and/or 164 is to be displayed to scanner 300), and where invisible light intensity data source 408 may be any suitable source for providing such intensity data (e.g., an airline ticketing application 103, which may be accessible to processor 102, or a more root application 103 of device 100 that may dictate all other applications running on device 100, such as an application that dictates the intensity of any invisible information displayed by output component 112a, where such intensity data of such an application may be controlled by scanner information received from scanner 300 and/or any other suitable factor that may be determined by device 100).

Depending on the type of display technology utilized by display assembly output component 112a, a particular one of multiple data combiner modules of system 401 may be used to process received data 403, 405, 407, and 409 for providing one or more control signals to one or both of color controller 131 and intensity controller 141 of display assembly output component 112a. For example, when display assembly output component 112a utilizes one or more pixels not configured to generate its own luminance but that utilizes a backlight with both a visible light source and a distinct invisible light source (e.g., pixel 122b of FIG. 3B with visible light source 145 and invisible light source 147), system 401 may at least leverage a first data combiner module 410. First data combiner module 410 may be configured to receive and process both visible light color data 403 and invisible light color data 405, and then first data combiner module 410 may be configured to generate and transmit a corresponding first color control signal 411 to color controller 131 based on such received and processed visible light color data 403 and invisible light color data 405. First color control signal 411 may be configured to control color controller 131 to appropriately electrically control electronic switch matrix 130 for electrically controlling every pixel 122 of pixel matrix 120 such that pixel matrix 120 may transmit both visible light data (e.g., visible light data 172, 174, and 176 of GUI 170) according to visible light color data 403 as well as invisible light data (e.g., invisible light data 162 and/or 164) according to invisible light color data 405. Concurrently, system 401 may pass visible light intensity data 407 on to visible light source 145 and invisible light intensity data 409 on to invisible light source 147 of intensity controller 141, where visible light intensity data 407 may be configured to control visible light source 145 of intensity controller 141 to appropriately transmit visible light 144 through backlight 140 such that each pixel of pixel matrix 120 may transmit visible light data of an appropriate intensity according to visible light intensity data 407, and where invisible light intensity data 409 may be configured to control invisible light source 147 of intensity controller 141 to appropriately transmit invisible light 146 through backlight 140 such that each pixel of pixel matrix 120 may transmit invisible light data of an appropriate intensity according to invisible light intensity data 409.

As another example, when display assembly output component 112a utilizes one or more pixels not configured to generate its own luminance but that utilizes a backlight with an all light source (e.g., pixel 122b of FIG. 3B with one or more all light sources 143, which may be configured to transmit full spectrum light 142 over the full spectrum of both visible light and invisible light through backlight 140), system 401 may at least leverage a third data combiner module 414. Third data combiner module 414 may be configured to receive and process both visible light color data 403 and invisible light color data 405, and then third data combiner module 414 may be configured to generate and transmit a corresponding third color control signal 415 to color controller 131 based on such received and processed visible light color data 403 and invisible light color data 405. Third color control signal 415 may be configured to control color controller 131 to appropriately electrically control electronic switch matrix 130 for electrically controlling every pixel 122 of pixel matrix 120 such that pixel matrix 120 may transmit both visible light data (e.g., visible light data 172, 174, and 176 of GUI 170) according to visible light color data 403 as well as invisible light data (e.g., invisible light data 162 and/or 164) according to invisible light color data 405. Concurrently, third data combiner module 414 may be configured to receive and process both visible light intensity data 407 and invisible light intensity data 409, and then third data combiner module 414 may be configured to generate and transmit a corresponding intensity control signal 417 to intensity controller 131 based on such received and processed visible light intensity data 407 and invisible light intensity data 409, where intensity control signal 417 may be configured to control all light source 143 of intensity controller 141 to appropriately transmit full spectrum light 142 through backlight 140 such that each pixel of pixel matrix 120 may transmit both visible light data of an appropriate intensity at least partially according to intensity control signal 417 and invisible light data of an appropriate intensity at least partially according to intensity control signal 417. However, in such embodiments, because there may be only a single type of light source for providing light through backlight 140 to all subpixels of pixel matrix 120 (e.g., to visible light subpixel 126-SP1 and to invisible light subpixel 126-SP4), additional control must be provided by third data combiner module 414 to at least partially independently control the intensity of visible light and the intensity of invisible light transmitted by display assembly output component 112a. Therefore, third data combiner module 414 may be configured to generate and transmit corresponding third color control signal 415 to color controller 131 based not only on received and processed visible light color data 403 and invisible light color data 405, but also based on one or both of received and processed visible light intensity data 407 and invisible light intensity data 409 (e.g., based on the difference between received and processed visible light intensity data 407 and invisible light intensity data 409). For example, while a user may dictate the value of visible light intensity data 407 (e.g., based on manual input selection), an application may automatically dictate the value of invisible light intensity data 409 (e.g., based on requirements of scanner 300). As these values of data 407 and 409 may differ, use of a single full spectrum light source 143 of backlight 140 must be supplemented by varying the electric control of electronic switch matrix 130 (e.g., using third color control signal 415) to universally raise or lower the amount of full spectrum light 142 from source 143 that is allowed to be transmitted through each visible light subpixel of pixel matrix 120 or to universally raise or lower the amount of full spectrum light 142 from source 143 that is allowed to be transmitted through each invisible light subpixel of pixel matrix 120. For example, in some embodiments, third data combiner module 414 may be configured to let visible light intensity data 407 dictate the intensity level of full spectrum light 142 emitted by source 143 (e.g., as communicated to intensity controller 141 via intensity control signal 417), while third data combiner module 414 may be configured to enable invisible light intensity data 409 to appropriately adjust the intensity of invisible light data transmitted by pixel matrix 120 by at least partially generating third color control signal 415 for controlling color controller 131 based on invisible light intensity data 409 (e.g., based on a difference between invisible light intensity data 409 and visible light intensity data 407).

As yet another example, when display assembly output component 112a utilizes one or more pixels configured to generate its own luminance without utilizing a backlight (e.g., pixel 122a of FIG. 3A), system 401 may at least leverage a second data combiner module 412. Second data combiner module 412 may be configured to receive and process visible light color data 403, invisible light color data 405, visible light intensity data 407, invisible light brightness data 409, and then second data combiner module 412 may be configured to generate and transmit a corresponding second color control signal 413 to color controller 131 based on such received and processed visible light color data 403, invisible light color data 405, visible light intensity data 407, invisible light brightness data 409. Second color control signal 413 may be configured to control color controller 131 to appropriately electrically control electronic switch matrix 130 for electrically controlling every pixel 122 of pixel matrix 120 such that pixel matrix 120 may transmit both visible light data (e.g., visible light data 172, 174, and 176 of GUI 170) according to visible light color data 403 and visible light intensity data 407, as well as invisible light data (e.g., invisible light data 162 and/or 164) according to invisible light color data 405 and invisible light intensity data 409. Due to the fact that each pixel of such a pixel matrix 120 may be independently controlled by switch matrix 130 to determine its own color and intensity for both visible light data and invisible light data without any effect by a backlight, second data combiner module 412 need not generate and transmit a distinct control signal to intensity controller 141.

FIG. 5 is a flowchart of an illustrative process 500 for transmitting data using invisible light. At step 502 of process 500, visible light data may be transmitted via a display assembly of an electronic device. For example, as described with respect to FIGS. 2-4, visible light data 174 may be transmitted by display assembly output component 112a of electronic device 100, where visible light data 174 may be seen and comprehended by user 200. At step 504 of process 500, invisible light data may be transmitted via the display assembly, where the transmitted invisible light data includes information configured to be received and comprehended by a scanner device remote from the electronic device. For example, as described with respect to FIGS. 2-4, invisible light data 164 may be transmitted by display assembly output component 112a of electronic device 100, where invisible light data 164 includes information (e.g., with respect to a redeemable airline ticket) configured to be received and comprehended by scanner 300 that may be remote from electronic device 100. In some embodiments, steps 502 and 504 may occur simultaneously. In other embodiments, process 500 may alternate between steps 502 and 504 at a refresh rate of the display assembly.

It is understood that the steps shown in process 500 of FIG. 5 are merely illustrative and that existing steps may be modified or omitted, additional steps may be added, and the order of certain steps may be altered.

Figure 6:
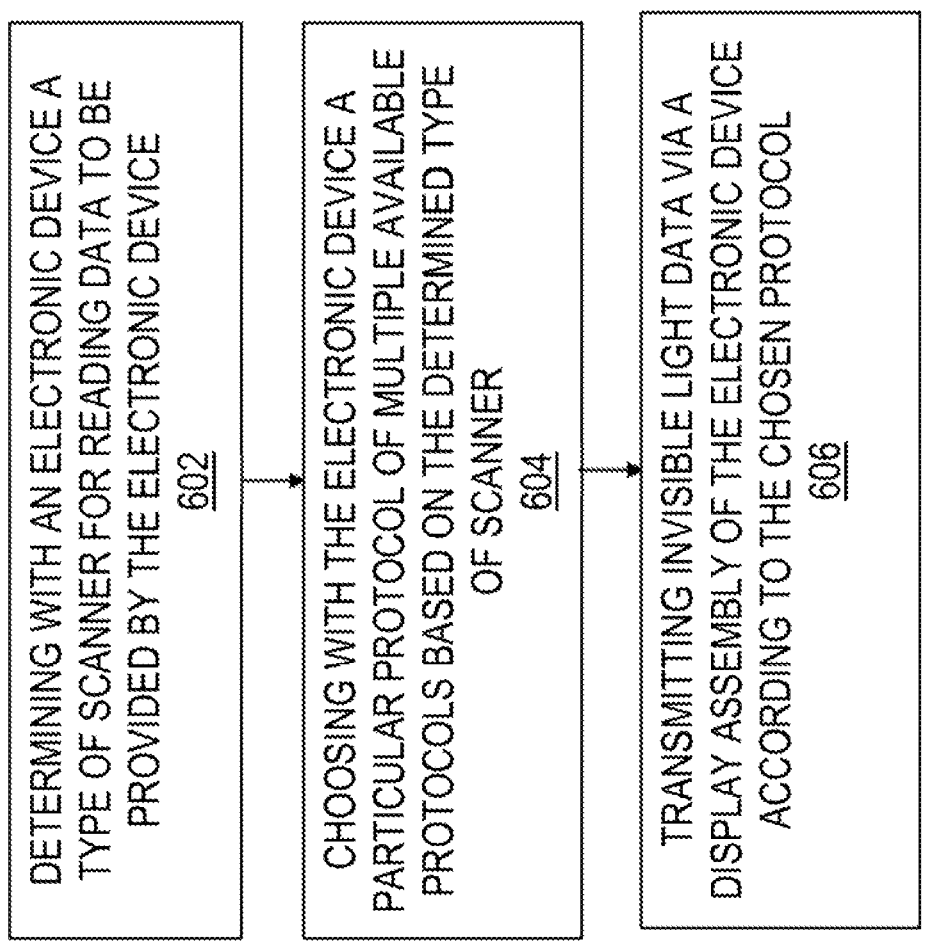

FIG. 6 is a flowchart of an illustrative process 600 for transmitting data using invisible light. At step 602 of process 600, an electronic device may determine a type of scanner configured to read data to be provided by the electronic device, and then at step 604 of process 600, a particular protocol of multiple available protocols may be chosen by the electronic device based on the determined type of scanner, and then at step 606 of process 600, invisible light data may be transmitted via a display assembly of the electronic device according to the chosen protocol. In some embodiments, the multiple available protocols include a first protocol for transmitting the invisible light data by switching between simultaneously transmitting invisible light via every pixel of the display assembly able to transmit invisible light and simultaneously not transmitting invisible light via every pixel of the display assembly able to transmit invisible light, and a second protocol for transmitting the invisible light data by simultaneously transmitting invisible light via a first group of pixels of the display assembly able to transmit invisible light and not transmitting invisible light via a second group of pixels of the display assembly able to transmit invisible light. For example, as described above with respect to FIGS. 2-4, electronic device 100 may determine a type of scanner 300 that may receive invisible light data transmitted by device 100, and device 100 may transmit invisible light data to scanner 300 according to a protocol (e.g., as a barcode or according to a Morse-code type protocol) at least partially based on the determined scanner type.

It is understood that the steps shown in process 600 of FIG. 6 are merely illustrative and that existing steps may be modified or omitted, additional steps may be added, and the order of certain steps may be altered.

FIG. 7 is a flowchart of an illustrative process 700 for transmitting invisible light. At step 702 of process 700, an electronic device may detect a need for additional light in an environment of the electronic device. For example, light sensor input component 110j of electronic device 100 may be configured to determine when additional light may be needed in an environment of device 100 for a particular purpose (e.g., for properly detecting a face of user 200 of device 100). Next, at step 704 of process 700, the electronic device may determine that the amount of visible light in the environment is to be limited. For example, an application 103 of processor 102 of device 100 may determine that the amount of visible light in the environment of device 100 is to be limited (e.g., in response to detecting that there is currently little visible light in the environment or the user has instructed device 100 to limit the amount of visible light in the environment). For example, the user may configure device 100 to be in a "night-time reading mode", where the user wishes for device 100 to generate as little visible light as possible (e.g., to generate only the amount of visible light to provide the user with visible data to be read, such as textual visible light data 174). Next, at step 706, process 700 may include transmitting both visible light and invisible light into the environment via a single display assembly of the electronic device in response to the detected need of step 702 and in response to the determination of step 704. For example, device 100 may transmit textual visible light data 174 via display assembly 112a that may be read by user 200, and device 100 may also transmit invisible light via display assembly 112a, where such invisible light may reflect off of user 200 and the reflected invisible light may be received by device 100 (e.g., via an invisible light sensor input component 110j), where such received reflected invisible light may be used by device 100 to recognize a face of user 200. This may be preferable over reflecting visible light off of user 200 suitable for facial recognition due to the determination at step 604 to limit the amount of visible light in the environment.

It is understood that the steps shown in process 700 of FIG. 7 are merely illustrative and that existing steps may be modified or omitted, additional steps may be added, and the order of certain steps may be altered.

Moreover, one, some, or all of the processes described with respect to FIGS. 1-7 may each be implemented by software, but may also be implemented in hardware, firmware, or any combination of software, hardware, and firmware. They each may also be embodied as machine-or computer-readable code recorded on a machine-or computer-readable medium. The computer-readable medium may be any data storage device that can store data or instructions which can thereafter be read by a computer system. Examples of such a non-transitory computer-readable medium (e.g., memory 104 of FIG. 1) may include, but are not limited to, read-only memory, random-access memory, flash memory, CD-ROMs, DVDs, magnetic tape, removable memory cards, optical data storage devices, and the like. The computer-readable medium can also be distributed over network-coupled computer systems so that the computer-readable code is stored and executed in a distributed fashion. For example, the computer-readable medium may be communicated from one electronic device to another electronic device using any suitable communications protocol (e.g., the computer-readable medium may be communicated to electronic device 100 via communications component 106 (e.g., as at least a portion of application 103)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of system 401 may be provided as a software construct, firmware construct, one or more hardware components, or a combination thereof. For example, any or each module of system 401 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of system 401 are merely illustrative, and that the number, configuration, functionality, and interconnection of existing modules may be modified or omitted, additional modules may be added, and the interconnection of certain modules may be altered.

At least a portion of one or more of the modules of system 401 may be stored in or otherwise accessible to device 100 in any suitable manner (e.g., in memory 104 of device 100 (e.g., as at least a portion of application 103)). Any or each module of system 401 may be implemented using any suitable technologies (e.g., as one or more integrated circuit devices), and different modules may or may not be identical in structure, capabilities, and operation. Any or all of the modules or other components of system 401 may be mounted on an expansion card, mounted directly on a system motherboard, or integrated into a system chipset component (e.g., into a "north bridge" chip).

Any or each module of system 401 may be a dedicated system implemented using one or more expansion cards adapted for various bus standards. For example, all of the modules may be mounted on different interconnected expansion cards or all of the modules may be mounted on one expansion card. With respect to system 401, by way of example only, the modules of system 401 may interface with a motherboard or processor 102 of device 100 through an expansion slot (e.g., a peripheral component interconnect ("PCI") slot or a PCI express slot). Alternatively, system 401 need not be removable but may include one or more dedicated modules that may include memory (e.g., RAM) dedicated to the utilization of the module. In other embodiments, system 401 may be at least partially integrated into device 100. For example, a module of system 401 may utilize a portion of device memory 104 of device 100. Any or each module of system 401 may include its own processing circuitry and/or memory. Alternatively, any or each module of system 401 may share processing circuitry and/or memory with any other module of system 401 and/or processor 102 and/or memory 104 of device 100.

It is also to be understood that visible light may include all electromagnetic radiation that is visible to the human eye. Such visible light may have a wavelength in the range of about 360 nanometers to about 740 nanometers. Invisible light may include electromagnetic radiation that is not visible to the human eye, such as ultraviolet light below 360 nanometers and infrared light above 740 nanometers.

While there have been described systems, methods, and computer-readable media for transmitting data using invisible light via a display assembly of an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. An electronic device comprising:
   a processor; and
   a display assembly comprising:
      a plurality of pixels arranged in a pixel matrix; and
      a variable control component spanning the pixel matrix, wherein the processor is configured to control the variable control component for simultaneously varying:
         a first characteristic of visible light transmitted by a first pixel of a first subplurality of pixels of the plurality of pixels; and
         a second characteristic of invisible light transmitted by each pixel of a second subplurality of pixels of the plurality of pixels, wherein the second subplurality of pixels only comprises each pixel of the plurality of pixels positioned in a band region along the outer perimeter of the pixel matrix.

2. The electronic device of claim 1, wherein the variable control component comprises a backlight component.

3. The electronic device of claim 2, wherein:
   the backlight component comprises a visible light source and an invisible light source;
   the variable control component varies the first characteristic of the visible light by adjusting a characteristic of the visible light source; and
   the variable control component varies the second characteristic of the invisible light by adjusting a characteristic of the invisible light source.

4. The electronic device of claim 2, wherein:
   the backlight component comprises a full spectrum light source;
   the display assembly further comprises a plurality of electronic switches arranged in a switch matrix;
   the variable control component varies the first characteristic of the visible light by adjusting a characteristic of the full spectrum light source; and
   the variable control component varies the second characteristic of the invisible light by adjusting a characteristic of the plurality of electronic switches.

5. The electronic device of claim 1, wherein the variable control component comprises a plurality of electronic switches arranged in a switch matrix.

6. The electronic device of claim 1, wherein:
   the first characteristic is a brightness of the visible light transmitted by the first pixel; and
   the second characteristic is a brightness of the invisible light transmitted by the second pixel.

7. The electronic device of claim 1, wherein:
   the first characteristic is a color of the visible light transmitted by the first pixel; and
   the second characteristic is a brightness of the invisible light transmitted by the second pixel.

8. The electronic device of claim 1, wherein:
   the same pixel comprises a plurality of subpixels;
   a first subpixel of the plurality of subpixels comprises one of a red light subpixel, a green light subpixel, and a blue light subpixel; and
   a second subpixel of the plurality of subpixels comprises an invisible light subpixel.

9. The electronic device of claim 1, wherein the first pixel comprises a red light subpixel, a green light subpixel, and a blue light subpixel.

10. The electronic device of claim 9, wherein the first pixel further comprises an invisible light subpixel.

11. The electronic device of claim 1, wherein the second pixel comprises at least one invisible light subpixel.

12. The electronic device of claim 1, wherein the display assembly is a liquid crystal display assembly.

13. The electronic device of claim 1, wherein the display assembly is a plasma display assembly.

14. The electronic device of claim 1, further comprising a housing that comprises an opening provided through a wall of the housing, wherein:
   the visible light is transmitted by the first pixel through the opening; and the invisible light is transmitted by the second pixel through the opening.

15. An electronic device comprising:
a processor; and
a display assembly comprising:
   a plurality of pixels arranged in a pixel matrix; and
   a variable control component spanning the pixel matrix, wherein the processor is configured to control the variable control component for simultaneously enabling:
      a first characteristic of a first invisible light to be transmitted by a first pixel of the plurality of pixels;
      a second characteristic of a second invisible light to be transmitted by a second pixel of the plurality of pixels that is different than the first pixel; and
      a third characteristic of a first visible light to be transmitted by the first pixel, wherein the combination of the first invisible light and the second invisible light is configured to convey information to a scanner device.

16. The electronic device of claim 15, wherein the combination of the first invisible light and the second invisible light comprises one of a linear barcode and a matrix barcode.

17. The electronic device of claim 15, wherein:
the first characteristic is a first intensity; and
the second characteristic is a second intensity that is different than the first intensity.

18. The electronic device of claim 15, wherein:
the first characteristic is a first intensity; and
the second characteristic is a second intensity that is equal to the first intensity.

19. The electronic device of claim 15, wherein:
the first characteristic is a first intensity; and
the third characteristic is a second intensity that is different than the first intensity.

20. An electronic device comprising:
a processor; and
a display assembly comprising:
   a plurality of pixels arranged in a pixel matrix; and
   a variable control component spanning the pixel matrix, wherein the processor is configured to control the variable control component for simultaneously enabling:
      a first characteristic of a first invisible light to be transmitted by a first pixel of the plurality of pixels;
      a second characteristic of a second invisible light to be transmitted by a second pixel of the plurality of pixels that is different than the first pixel; and
      a third characteristic of a first visible light to be transmitted by the first pixel; and
      a fourth characteristic of a second visible light to be transmitted by the second pixel.

21. The electronic device of claim 20, wherein:
the third characteristic is a first intensity; and
the fourth characteristic is a second intensity that is different than the first intensity.

22. The electronic device of claim 20, wherein:
the third characteristic is a first visible color; and
the fourth characteristic is a second visible color that is different than the first visible color.

23. The electronic device of claim 4, wherein:
the first characteristic is a brightness of the visible light transmitted by the first pixel; and
the second characteristic is a brightness of the invisible light transmitted by the second pixel.

24. The electronic device of claim 22, wherein:
the first characteristic is a first intensity; and
the second characteristic is a second intensity that is equal to the first intensity.

* * * * *